United States Patent
Ameline et al.

(10) Patent No.: US 7,139,444 B2
(45) Date of Patent: Nov. 21, 2006

(54) METHOD FOR APPLYING A DIGITAL WATERMARK TO AN OUTPUT IMAGE FROM A COMPUTER PROGRAM

(75) Inventors: Ian R. Ameline, Toronto (CA); Alphonse L. Lopez, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 1114 days.

(21) Appl. No.: 10/035,335

(22) Filed: Jan. 4, 2002

(65) Prior Publication Data
US 2003/0131237 A1    Jul. 10, 2003

(51) Int. Cl.
  *G06K 9/54*    (2006.01)
  *G06K 9/60*    (2006.01)
(52) U.S. Cl. .................. 382/305; 382/100; 382/232; 713/176
(58) Field of Classification Search ................ 382/100, 382/232, 276, 305; 713/176; 380/200, 243, 380/247, 255, 155; 358/3.28; 348/461, 348/467, 211.5
See application file for complete search history.

(56) References Cited

U.S. PATENT DOCUMENTS

| | | | |
|---|---|---|---|
| 6,826,559 B1 * | 11/2004 | Ponte | 707/3 |
| 6,912,512 B1 * | 6/2005 | Miyazaki et al. | 705/51 |
| 2002/0107750 A1 * | 8/2002 | Kanevsky et al. | 705/26 |
| 2002/0164047 A1 * | 11/2002 | Yuval | 382/100 |
| 2003/0039376 A1 * | 2/2003 | Stach | 382/100 |
| 2003/0112974 A1 * | 6/2003 | Levy | 380/210 |
| 2003/0196093 A1 * | 10/2003 | Raley et al. | 713/176 |
| 2003/0208679 A1 * | 11/2003 | Lopez Vazquez | 713/176 |

* cited by examiner

*Primary Examiner*—Jingge Wu
*Assistant Examiner*—Ali Bayat
(74) *Attorney, Agent, or Firm*—Patterson & Sheridan, L.L.P.

(57) ABSTRACT

A visible digital watermark is applied to output images from a computer program. Various attributes of the watermark are modified from image to image, making the watermark difficult to remove. For example, a watermark indicating "not for commercial use" can be applied to all output images from the program. Such watermarking permits full functioning demonstration versions of the computer program to be freely distributed to users while commercial use is inhibited. This is accomplished by a minimal level of intrusiveness to file sharing capabilities between a commercial version of the software and a non-commercial version of the software.

42 Claims, 7 Drawing Sheets

Alias|Wavefront
Commercial use
of file prohibited
by license
Alias|Wavefront

METHOD FOR APPLYING A DIGITAL WATERMARK TO AN OUTPUT IMAGE FROM A COMPUTER PROGRAM

BACKGROUND OF THE INVENTION

1. Field of the Invention

The present invention relates generally to the field of computer software and, more particularly, to a method of software protection involving digital watermarking of output images from a computer program.

2. Related Art

To promote their computer programs (also called "software"), some companies (e.g., software venders) distribute for free, and permit users to use, demonstration or trial versions of their software. A software vender can benefit in many ways by allowing certain users to have free access to their software. For example, increased access to its software can build market share. The more that people are familiar with the operation and use of the software, the more that people will develop a preference for the software. By enabling users to advance skills, a long lasting and more fluid connection to the market can be established. Further, the career growth and professional advancement of the user can be affected by the pervasiveness of software, further increasing demand. Thus, it can be to a software vender's advantage to provide free access to its software.

A delicate balance must be struck, however, between the company's objective of increasing popularity of the software to achieve market pervasiveness and the company's objective of maximizing profit from sales of the software. For example, if the company focuses too much on achieving market pervasiveness by allowing users unlimited use and functionality of their commercial software, the company can risk sacrificing its profit-making objective.

In attempts to balance these marketing goals with the need to make sales of the software, the free or demonstration (demo) versions of the software typically have limited functionality and/or limited demo use time. For example, some companies allow users to use software on a "trial-run" basis to provide the users with an opportunity to discover whether they perceive enough value in the software to purchase a fully functioning commercial version. A problem with this approach is that the "trial-run" period is often not long enough to actually provide users with enough time to determine whether they actually like the software.

An example of functionality limits that may be placed on the software include preventing users from saving/copying output from the software, and/or preventing printing output produced by the software. This reduces the commercial usefulness of the software and encourages users to purchase a commercial version. However, by preventing the users from saving/copying output from the software, and/or preventing the users from printing output produced by the software, users are not able to experience the full functionality of the software. This reduces the demo version's marketing effectiveness.

There is further a need in the industry to provide demo versions of software that can be used by students to learn how to use the software. Educating students in the use of a particular software package benefits the student by making him or her more marketable in the industry, benefits industry by providing access to more trained workers, and benefits the software vender because more trained users of their software creates more of market demand for the software. However, conventional demo versions of software are not suitable for training students. A limited functionality demo program does not typically permit a student to become proficient in use of the program. Further, a 30 or 60 day time limit does not typically provide sufficient time to learn a complex computer program.

In seeking a solution to these problems, some software venders have removed the time limits and functionality limits on the demo software. Instead, they have implemented a system where the software may be used a limited number of times before the software requires that a code be entered to unlock it for unlimited use. The code is provided by the software vender upon purchase of a usage license. This solution, however, does not help the student who needs unlimited access to the software. This solution also does not prevent a user from simply reinstalling the software to reset the usage count.

Thus, there are limited options available to a software vender who wishes to provide free copies of software to students and educational institutions. If full functionality copies of the software are given to students at no charge, there is a risk that the copies will be put to commercial use. If enough functionality is removed from the software to protect against unlicensed commercial use, then the training effectiveness of the software is similarly reduced.

These problems are particularly felt by companies that sell high-end drawing, drafting, animation, modeling, and Computer-Aided Industrial Design (CAID) programs. Such programs can be expensive such that students cannot typically afford to purchase their own copy. Such programs are also complex to use, requiring many hours of hands-on training to master use.

Therefore, there is a strong need in the industry for a way to protect against unlicensed commercial usage of computer software while still permitting full functioning or nearly full functioning versions of the software to be distributed for educational and demonstration purposes.

SUMMARY OF THE INVENTION

The present invention protects against unlicensed commercial usage of a computer program by marking the graphical output of the computer program with a visible digital watermark. The digital watermark may indicate, for example, that the program is not licensed for commercial use. The invention creates a digital watermark that is difficult to remove. This permits software produced in accordance with the present invention to be freely distributed for demonstration and educational usage while encouraging purchase of a commercial version of the software for commercial use.

The present invention employs a two-step method. A digital watermark is generated in the first step and applied to the output image in the second step. In the first step, for each output image, a digital watermark is generated having at least one attribute that is a function of a variable associated with the attribute. Each variable is capable of modification from image to image to produce a digital watermark with different attributes on each output image. This results in increased difficulty in removing the digital watermark from the output images.

In a preferred embodiment, the digital watermark is text that conveys a message about the non-commercial nature of the software. For example, the text may say "not licensed for commercial use," "demonstration version only," "educational purposes only," or similar textual messages. In other embodiments, the watermark can be a graphical image such as a symbol or logo or any other visible mark that serves the purpose of discouraging commercial use of the demo version of the software.

In a preferred embodiment, the attributes of the watermark that are varied include, for example, font type, font size, font spacing, watermark orientation, position of watermark, transparency, color, diffusion, and the like. These attributes may be varied by retrieving different pieces of a watermark or different watermarks from memory based on one more variables, by retrieving one or more pieces of a watermark or one or more watermarks from memory and modifying one or more of the attributes based on one or more variables, or by a combination of retrieving based on one or more variables and modifying based on one or more variables. In a preferred embodiment, the variable(s) that control(s) the attributes is (are) a function of a pseudo-random number. The pseudo-random number is generated in such a way as to make predicting the next number in the sequence computationally infeasible. This increases the effort required to remove the watermarks from images produced by the software. For example, if (through considerable effort) a hacker were to develop an algorithm for removing the watermark from a single image, the algorithm would be of no use for a second image which would have a different watermark. Any algorithm developed would only be useful for an image bearing the exact same watermark. Since the invention (in one embodiment) places a different watermark on each image, an algorithm to automate watermark removal cannot be developed.

To further increase the difficulty of removing the watermarks, the watermark(s) is(are) employed over a substantial portion (e.g., more than about 50% and preferably more than about 75%) of the image. When a watermark or other superimposed image covers only a small portion of an image without the superimposed images overlapping in position from image to image, they can be removed relatively easily.

To prevent a user from removing a watermark by blurring an image and then filtering it down from a very high resolution (e.g., 16,000 by 16,000 pixels) to a lower resolution (e.g., 1024×1024 pixels), in the invention limits the resolution of any image produced by the protected software. By not permitting such high resolution images to be created, such filtering can be prevented. For example, in one embodiment, the invention limits the output image resolution to 2048 by 2048 pixels.

An advantage of the invention is that it allows a computer program to be freely distributed for educational use, demonstration (evaluation) use, or use of a similar non-commercial nature by certain users while limiting the commercial usability/utility of the program.

Another advantage is that the watermark of the invention can be applied to any image output by a computer program regardless of output format (e.g., stored in a file; printed on paper; placed on film; stored in any electronic, magnetic or optical media; written to a frame buffer; or displayed on a display device such as a CRT, plasma display, active matrix display, LCD, or the like).

Another advantage of the invention is that a digital watermark according to the invention can have a saturation level (e.g., five to thirty-five percent) that makes it visible but not overly intrusive.

Yet another advantage of the digital watermark is that the various attributes can be manipulated from one application of the digital watermark to the next application, as desired, to increase the difficulty of removal. For example, each color channel of the digital watermark can be perturbed before it is applied to and blended with the output image. This allows the digital watermark to be much less vulnerable to attack by a multi-pass rendering technique.

Still other advantages of the software protection method of the invention are that it has a minimal performance and size impact on the underlying software program and is completely portable between hardware systems/platforms. Maintaining a minimal size for the software prevents the underlying software program from becoming significantly larger. When the software is offered via download on the Web, for example, maintenance of a minimal size can also reduce distribution costs.

BRIEF DESCRIPTION OF THE DRAWINGS/FIGURES

The accompanying drawings, which are incorporated herein and form part of the specification, illustrate the present invention and together with the description further serve to explain the principles of the invention and to enable a person skilled in the relevant art(s) to make and use the invention.

The features, objects, and advantages of the present invention will become more apparent from the detailed description set forth below when taken in conjunction with the drawings. In the drawings, like reference numbers generally indicate identical, functionally similar, and/or structurally similar elements. The drawing in which an element first appears is indicated by the leftmost digit in the corresponding reference number.

DETAILED DESCRIPTION OF THE INVENTION

While the present invention is described herein with reference to illustrative embodiments for particular applications, it should be understood that the invention is not limited thereto. A person skilled in the relevant art will recognize that other configurations and arrangements can be used without departing from the spirit and scope of the present invention. It will be apparent to a person skilled in the relevant art that this invention can also be employed in a variety of other applications.

Figure 1:
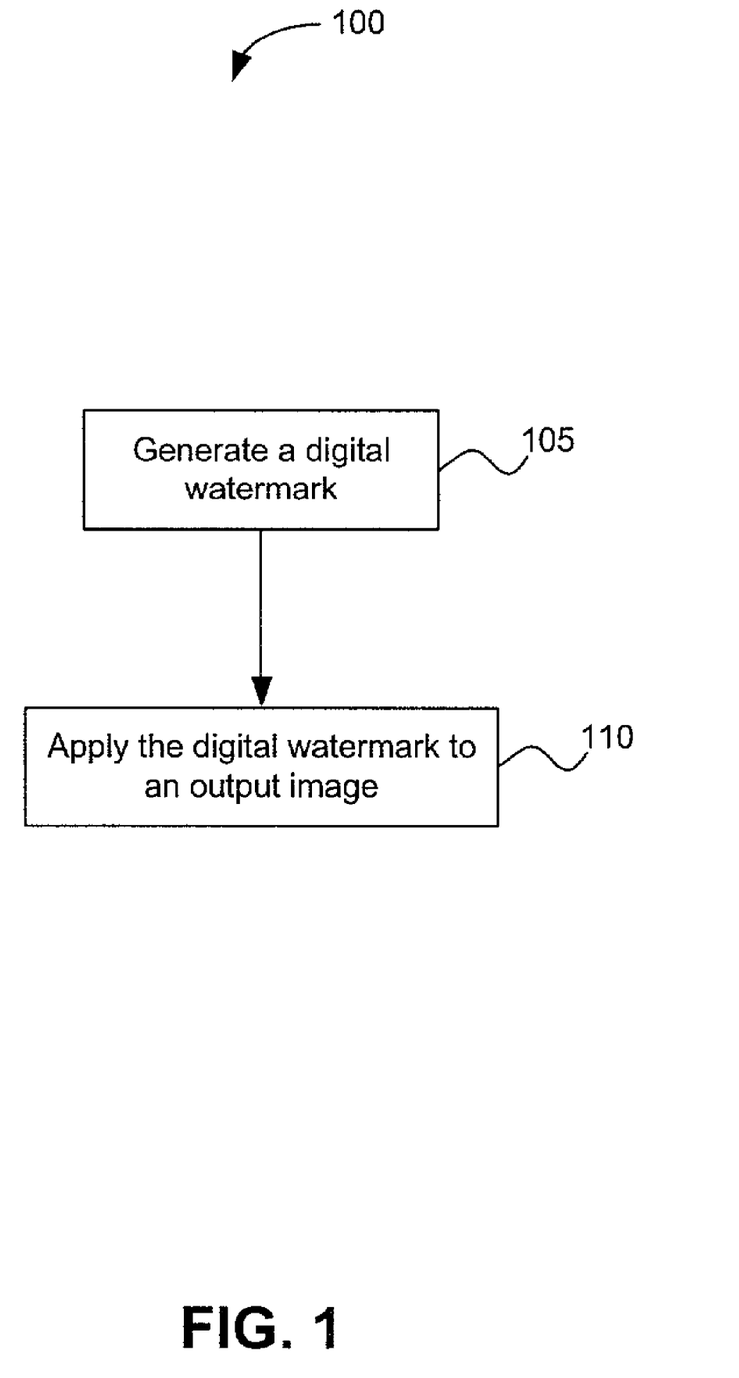
FIG. 1 is a flow diagram illustrating the general operational flow for a method for applying a digital watermark to an output image from a computer program according to an embodiment of the present invention.

FIG. 1 depicts a flowchart 100 of the method of the invention for applying a digital watermark to an output image in accordance with an embodiment of the present invention. The invention, however, is not limited to the embodiment depicted by flowchart 100. Rather, it will be apparent to persons skilled in the relevant art(s) from the teachings provided herein that other functional flows are within the scope and spirit of the present invention.

Referring now to FIG. 1, a digital watermark is generated in a step 105. Once generated, the watermark is applied to an output image in a step 110. In one embodiment of the present invention, the digital watermark is stored in a computer memory amongst a plurality of different digital watermarks. Each digital watermark has at least one attribute. Each attribute of the digital watermark has an associated variable or index that can be altered to change the particular attribute of the digital watermark. In one embodiment of the present invention, the variables are a function of a pseudo random number. The term "pseudo-random" includes both random numbers and numbers that are less than random since true randomness is difficult to achieve. The term "pseudo-random" further includes any number or function that is difficult to predict, arbitrary or a function of some arbitrary value such as time or hardware serial numbers. Further, the terms "random" and "pseudo-random" are used interchangeably in this specification.

The digital watermark can be generated by retrieving it or a portion of it from memory. For example, a variable can be used as an index to select one of a plurality of different watermarks or watermark portions stored in memory. Each stored watermark or watermark portion can have different attributes. For example, a first portion of a digital watermark retrieved from memory can have a completely different set of attributes than a second portion of the digital watermark retrieved from memory. In such a situation, one or more attributes associated with the first portion of the digital watermark will have different values than the associated attribute(s) of the second portion of the digital watermark. For example, a watermark portion comprising a word can be stored in different font styles, font sizes, colors, etc. In this case, font style would be one attribute, font size would be another attribute and so on.

In another embodiment, the portions of a digital watermark to be applied to an output image can first be selected from memory without using the variables for selection. For example, a single instance of a word could be stored in memory. In this embodiment, after each portion of the digital watermark is selected, each attribute for the digital watermark portion can then be varied according to the variable with which the particular attribute is associated.

As will be illustrated in the example of FIG. 3 (discussed below), attributes of a watermark can also be modified by doing a combination of the two embodiments discussed above, that is, by using a variable as an index to lookup a portion of a watermark and to then modify another attribute of the watermark portion based on a different variable after the lookup has occurred.

In yet another embodiment, the digital watermark is generated by calling an operating system or another library to render the digital watermark. For example, a call to a function can be made to cause a new digital watermark to be generated.

Referring back to step 110, the digital watermark can also be applied to any output of a computer program including, for example, a computer display, frame buffer, printed output or file. A software interface to graphics hardware such as OpenGL® (produced by Silicon Graphics, Inc., of Mountain View, Calif.), DirectX® and WindowsGDI (produced by Microsoft Corporation, Redmond, Wash.), or QuickDraw (produced by Apple Computer, Inc., Cupertino, Calif.) can be employed with the graphics hardware to apply the digital watermark on the computer display screen of the user. Similarly, a Central Processing Unit (CPU) can be employed to apply the digital watermark to the output image or texture produced by a computer program.

For example, a function can be called to apply the digital watermark to an entire output image generated by a computer program. Similarly, a function can be called to apply the digital watermark to an image tile. A function can also be called to apply the digital watermark to an image on a computer display screen (e.g., apply the digital watermark to the frame buffer) at a specified location with a specified size.

Further still, a function can be called to apply a portion of the digital watermark to a screen tile by applying the portion to a part of the frame buffer at a specified location with a specified size, for example. Such a function can be used by paint packages that perform incremental screen updates, for example.

Figure 2:
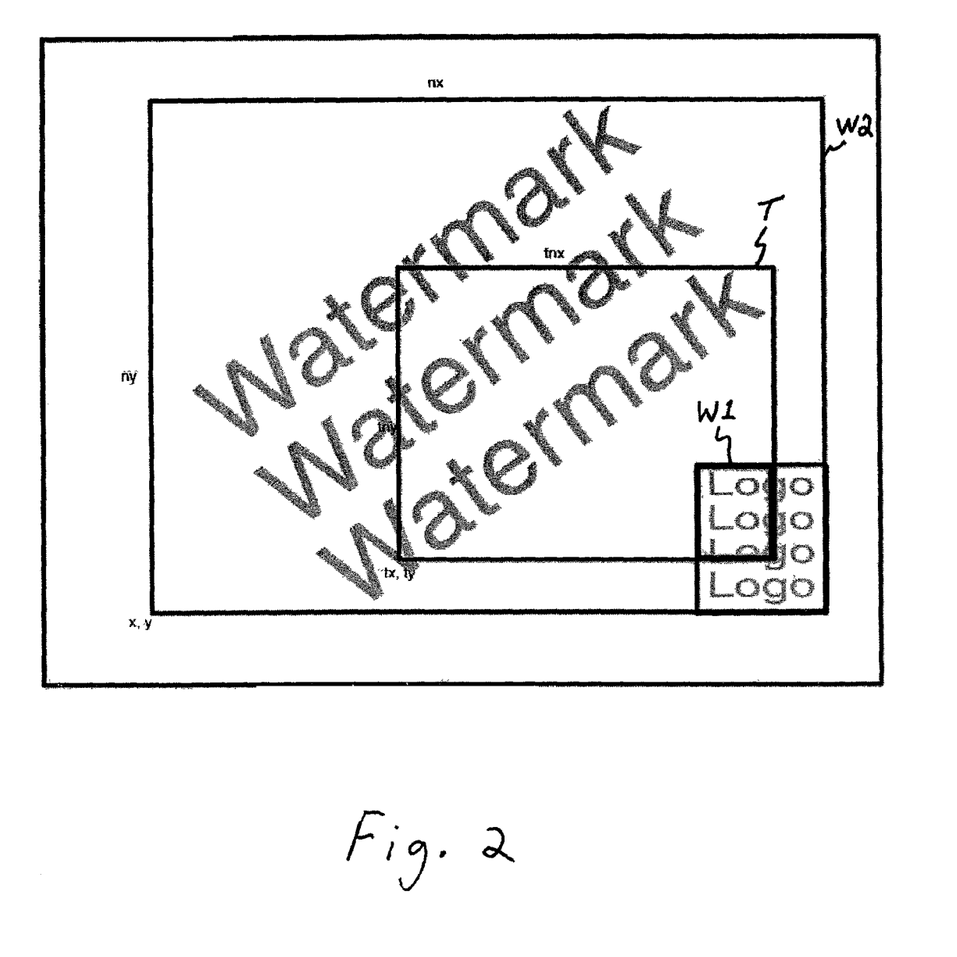
FIG. 2 is a diagram illustrating exemplary watermarks with associated parameters utilized in an embodiment of the present invention.

FIG. 2 illustrates exemplary watermarks depicting several associated parameters that can be provided as variables in the functions described above. FIG. 2 illustrates a small exemplary digital watermark entitled "Logo," located in small window W1, a large exemplary watermark entitled "Watermark," located in large window W2, and a tile T (i.e., a portion of the window W2).

Logo is an example of a small corner watermark. Logo can be a company logo or other identification indicia, for example. It may be made more visible than the larger watermark in window W2.

Watermark is an example of a large watermark. Watermark fits in the entire window W2. Watermark is defined by parameters x,y, nx, and ny. The parameters x and y can represent the x and y coordinates, respectively, of the bottom left corner of the entire watermark in screen pixels, for example. The parameters nx and ny can represent the X-plane size and Y-plane size, respectively, of the entire watermark in screen pixels, for example.

Tile T is a portion of the window W2. When only a portion of the image in tile T needs to be updated, the software program of the present invention updates the portion of the image in tile T. A watermark routine is then executed to watermark the portion of the image located in tile T.

Figure 3:
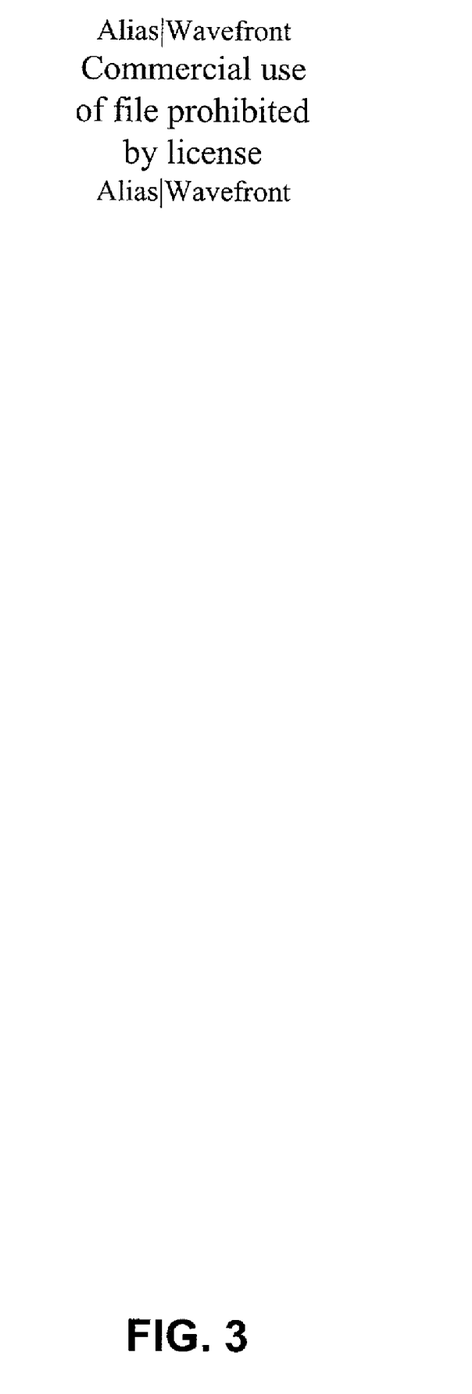
FIG. 3 is an exemplary digital watermark used to illustrate various attributes of a digital watermark in an embodiment of the present invention.

FIG. 3 illustrates sample text for use as a watermark 300 in accordance with the present invention. The attributes of watermark 300 include, for example, font type, x-dimension size, y-dimension size, rotation, text spacing, line spacing, opacity, and color. Watermark 300 is a textual image comprising five lines of text. It should be noted, however, that the digital watermark can be a text image or a graphical image. The five lines of text form a roughly square image. Each line of text represents a portion of the digital watermark.

In this example watermark, a group of variables encompassing forty-five bits are used to represent the various attributes. The variables define attributes for each portion of the digital watermark. In this example, eight bits are used to represent the possible variance for each line. Three bits ($2^3=8$ states of variance) specify variance of the size of the text in the X-dimension. Three bits specify variance of the text in the Y-dimension, and two bits specify variance of the font. This permits selection between four different fonts with eight different sizes in x and eight different sizes in y. As a whole (all five lines) of the watermark can be rotated at sixteen different angles. Four bits are used to represent this rotational variance. A final one of the 45 bits is used to indicate whether the font is italicized.

It will be apparent to one skilled in the relevant art that such a scheme provides for a large number of possible variations in the watermark applied from one image to the next. This variation decreases the likelihood of success of a hacker removing a digital watermark applied to the output image. Only by great manual labor will a hacker be able to remove a watermark from a single image. Difficulty in removing, disabling, or altering the digital watermark is further increased by allowing the various attributes of the digital watermark to be mutable.

Figure 4:
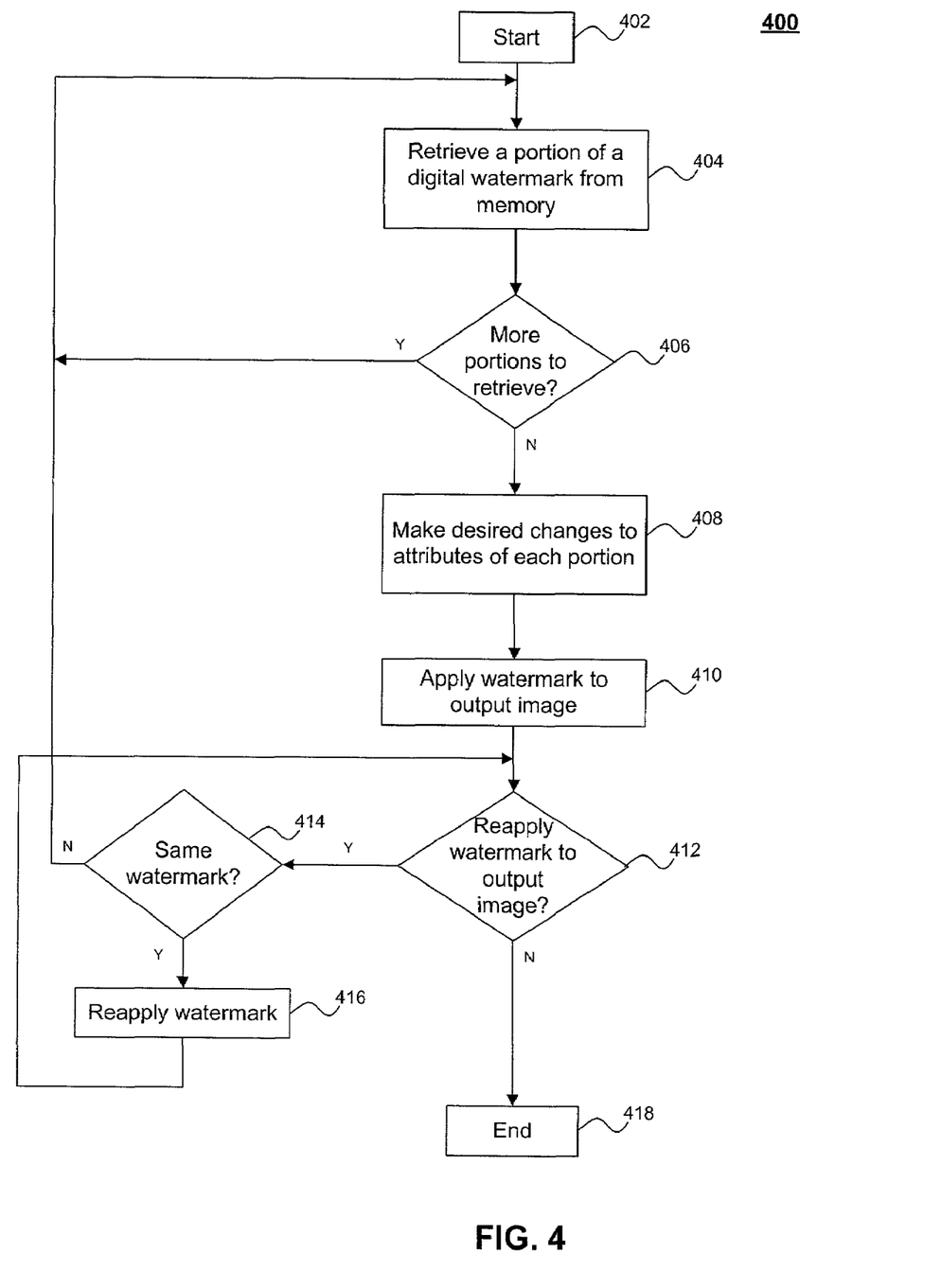
FIG. 4 is a flow diagram illustrating the general operational flow for a method of generating and applying a digital watermark to an output image according to an embodiment of the present invention.

FIG. 4 illustrates a method 400 for applying a digital watermark to an output Image. Method 400 can be employed for both static images (that is, non-animated images) and images used in animation. Since animation is a series of static images shown in sequence, method 400 can be repeated for each image in the animation series. In one implementation of the present invention, the digital watermark is first applied to a first image in the animation series. At least one attribute of the digital watermark can then be altered before applying the digital watermark to a second image in the animation series. In another implementation, however, the digital watermark can be applied to a group of images (i.e., 2 or more images) in the animation series wherein the attributes of the digital watermark remain the same for the group. This implementation recognizes that even if the watermark does not change in every image, it is still difficult to automate removal because of the variance across the larger animation which includes many groups of images.

Method 400 begins at step 402. In step 404, a digital watermark or a portion of a digital watermark is retrieved from memory (i.e., from system RAM or from disk). The watermark or portion of the watermark is selected from memory based on a variable. For example, referring to the example watermark of FIG. 3, one of the five lines of the watermark is retrieved in a particular font. In this example, the line is stored in memory in four different fonts. One of the font choices is selected based on the variable. In one implementation of the present invention, the variable used for the memory lookup can be based on a result of a random number generator. In a preferred embodiment, the random number is a cryptographically secure random number generator seeded with a combination of a machine-specific identifier, the date and time of day, and the number of microseconds that the machine has been powered up.

In decision step 406, a determination is made of whether there are more portions of the digital watermark to retrieve from memory. If there are more portions of the digital watermark to retrieve from memory, then control returns to step 404, where the next portion of the digital watermark is retrieved from memory according to a different variable. If it is determined at step 406 that there are no more portions of the digital watermark to retrieve from memory, then control proceeds to step 408.

In step 408, one or more attributes of the watermark are altered. For example, the x-dimension size, y-dimension size, orientation, etc. of watermark are selected. The alterations may be made to each portion or to the watermark as a whole.

In step 410, the watermark is applied to the output image by blending. At step 412, a determination is made whether to reapply the watermark to the image. The watermark may be applied a plurality of times at different locations on the image. If it is not desired to reapply the watermark, the method ends at step 418. If reapplication is desired, the method proceeds to step 414. At step 414, a determination is made whether to reapply the same watermark or a different watermark. If application of the same watermark is desired, it occurs at step 416. If application of a different watermark (the different watermark may be only a slightly modified version of the present watermark) is desired, the method returns to step 404, and the method is repeated to generate and apply the different watermark.

Figure 5:
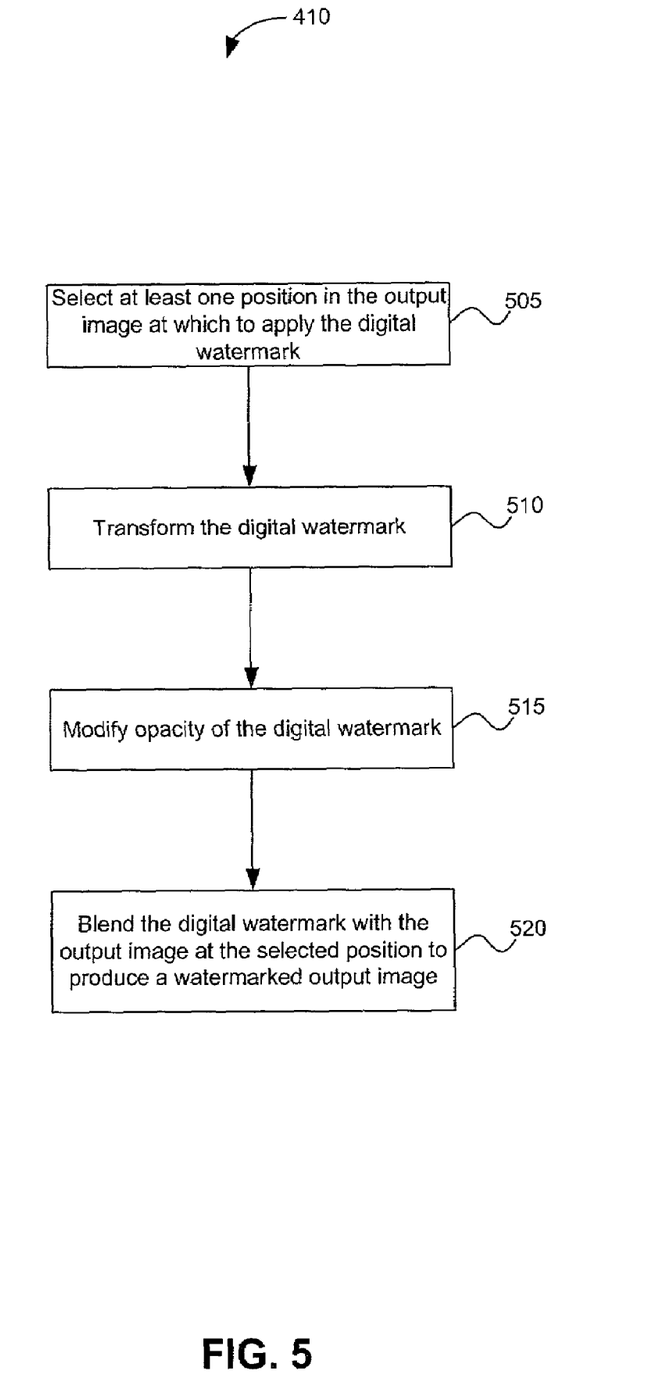
FIG. 5 is a flow diagram illustrating the general operational flow for step 410 of FIG. 4 of applying a digital watermark to an output image.

FIG. 5 illustrates step 410 of FIG. 4 in more detail. In a step 505, at least one position at which the digital watermark can be applied to the output image is selected. For example, the digital watermark can be applied at a position on the output image represented by a group of coordinates such as (x,y). In one embodiment of the present invention, the position at which the digital watermark is applied can be varied. For example, in a first application of the digital watermark, the digital watermark can be applied at a position represented by coordinates (a,b). In a second application of the digital watermark, the digital watermark can be applied at a position represented by coordinates (c,d).

In conjunction with the other attributes of the digital watermark, the variation in position of application of the digital watermark from one output image to another output image decreases the likelihood of success for a hacker to remove, alter, or disable the digital watermark.

To further increase the difficulty of removing the watermarks from a series of images, the watermark is employed over a substantial portion of each image. For example, the watermarks can be employed over more than about 50% and, preferably, over more than about 75% of the image. This typically results in significant overlap between one or more of the watermarks from image to image. The overlap and wide watermarked areas further increase the difficult of removing a watermark from a series of images. In contrast, when a watermark or other superimposed image covers only a small portion of an image without the superimposed images overlapping in position from image to image, they can be removed relatively easily. Removal is done based on a comparison from image to image of superimposed areas (e.g., watermarked areas) to corresponding non-superimposed areas. With the present invention, such removal techniques are thwarted because non-watermarked areas of an image are not available for comparison.

In one embodiment of the present invention, per-pixel color resolution of the output image can be limited to a specified amount (e.g., eight bits per color channel). Similarly, in one embodiment of the present invention, the size of the output image can be limited to a specified amount (e.g., 1024×1024 pixels or 2048×2048 pixels). The limitations can help prevent removal of the watermarks of the present invention. For example, if very high resolution (e.g., 16,000 by 16,000 pixels) images are used, a user could potentially remove a watermark by blurring the image and then filtering it down from the very high resolution to a lower resolution (e.g., 1024×1024 pixels). By not permitting such high resolution images to be created, such filtering can be prevented.

In step 510, the applied digital watermark is transformed. Transforming the digital watermark is defined as scaling, rotating, translating, and/or skewing the digital watermark. Those skilled in the relevant art will recognize that transforming the digital watermark can also encompass other visible operations which can be performed on an image. Transforming can also be varied with each application of the digital watermark. For example, the digital watermark can be rotated and applied at a different angle with each application of the digital watermark.

In one embodiment of the present invention, the digital watermark can be applied at a different position, scale, and/or rotation on each color channel of the target image to produce chromatic aberration on the resulting digital watermark. In yet another embodiment of the present invention, the digital watermark can be color scaled by scaling the value in each color channel of the digital watermark by a random amount on each pixel. This procedure is performed to generate chromatic noise.

In step 515, opacity of the digital watermark is modified. For example, the opacity of the digital watermark can be varied on a per-pixel basis based on brightness of a corresponding pixel in the output image to which the digital watermark is applied. In another implementation of the present invention, the opacity of the digital watermark can be varied based on the level of detail in the output image to which the digital watermark is applied.

In step 520, the digital watermark is blended with the output image at the selected position to produce a watermarked output image. Blending refers to the combining of color layers already produced (e.g., stored in a frame buffer memory, for example) with additional layers of colors placed over the layers already produced. The general concept of blending is well known by those skilled in the relevant art(s). During the blending operation, each color channel of the digital watermark can be randomly perturbed to increase difficulty involved in "hacking" the algorithm. In other words, slightly perturbing each color channel of the digital watermark will increase difficulty involved in attacking the blending algorithm of the present invention and removing or altering the digital watermark. This perturbation in combination with the other transformations described above (e.g., scaling, rotating, translating, and skewing) increase resistance of any hacking attempts based a multi-pass rendering scheme of the type described in U.S. Pat. No. 6,100,899, which is incorporated herein by reference.

During blending, the digital watermark may be altered to create an embossed appearance of the watermarked image. For example, the watermark can be scaled down in color space to have an opacity of a specified amount (e.g., 25%) and mathematically added into the target image (i.e., output image) using a saturated add operation. This involves adding the digital watermark into each of the four color channels (Red, Green, Blue, and Alpha ((translucency))) of the output image (i.e., destination=destination+source). For example, RGBA values for each pixel of the digital watermark (i.e., source image) can be blended with RGBA values of the output image (destination image, already stored in the framebuffer or in the computer memory). After the add operation, the digital watermark is half-subtracted (i.e., destination=destination−((source/2)) at a location represented by a specified value (e.g., at a location four pixels to the right of the digital watermark). Unlike the add operation, however, the half-subtraction operation, is not applied to the alpha channel of the output image. This half-subtraction operation causes the watermarked image to have an "embossed look." As discussed above, in a preferred embodiment, the invention is used to watermark the output of a computer program that is designated as not being for commercial use (i.e., a demo version) and is either given away for free or is sold at a reduced price. It is anticipated that these demo versions of the software will be used in conjunction with a commercial version of the software. The commercial version of the software will produce output that is not affected by watermarking.

While the invention will help limit unauthorized commercial use of the demo version of the software, an unscrupulous group of users may frustrate the non-commercial limitation of the demo version of the software by creating data files on demo versions of the software and purchasing only a single version of the commercial software to do the final print/display. To prevent this from occurring, the demo versions of the software should be modified to only read and write a special, scrambled file format (e.g., encrypted data, reordered data, or using other incompatible representations of the files). For example, in the case of computer aided industrial design software such as DESIGN STUDIO, available from Alias|Wavefront, a division of Silicon Graphics Ltd., Toronto, Canada., the demo version of the software would not be able to read or write native file formats such as MAYA or STUDIO TOOLS. In addition, the demo version would not be able to read or write neutral file formats such as IGES or STEP. Further, the commercial version of DESIGN STUDIO would be prevented from reading the special, encrypted, file format. Both versions of the software would be able to read and write image files. However, the image files from the demo version of the software will contain the digital watermark. In addition, a less restrictive approach can be utilized in which the non-commercial version can read the unencrypted files produced by the commercial version. The commercial version, however, should not be allowed to read the encrypted files of the non-commercial version.

Figure 6:
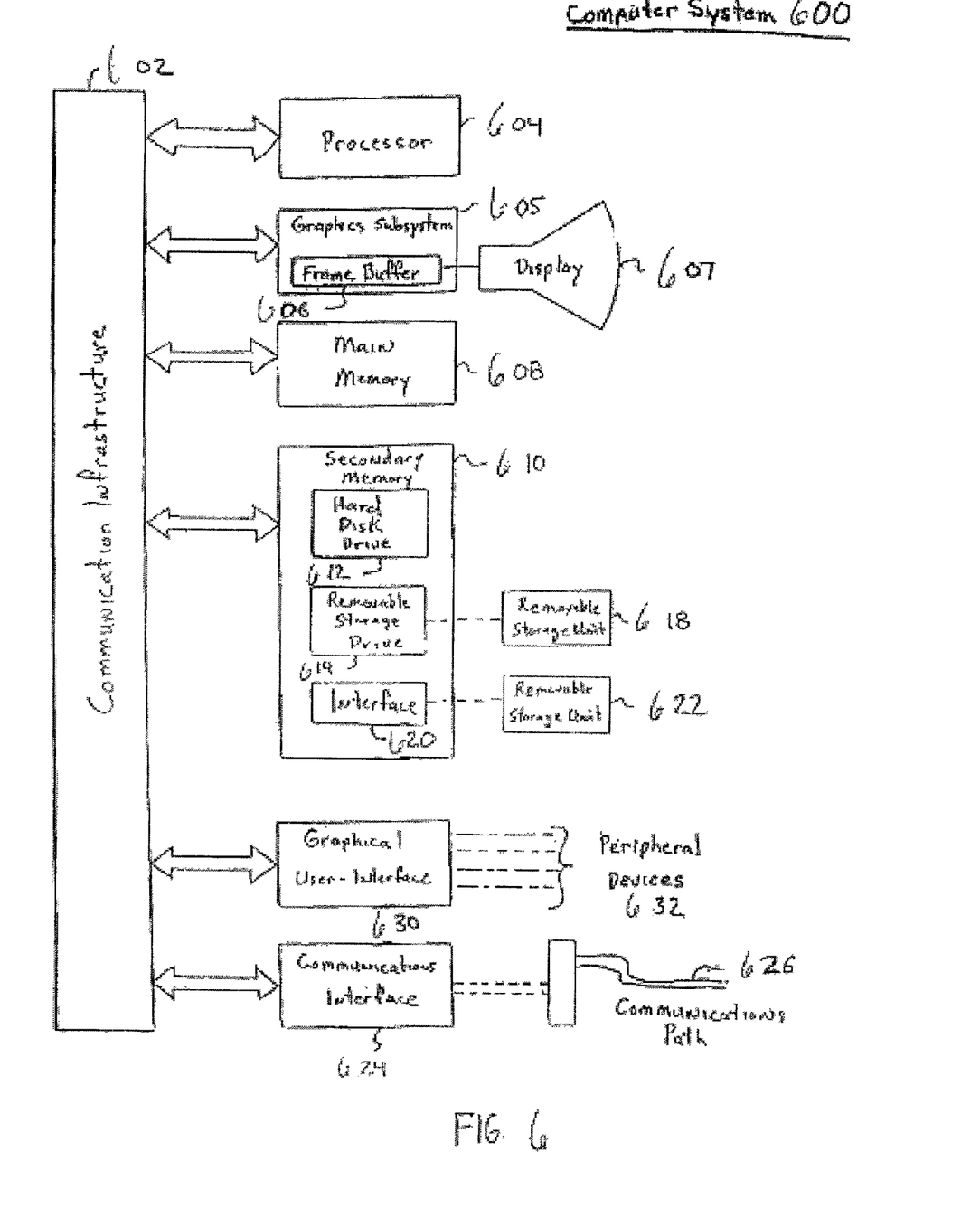
FIG. 6 is an exemplary computer system for implementing computer program product embodiments of the present invention.

FIG. 6 illustrates an example of a computer system 600 that can be used to implement computer program product embodiments of the present invention. This example computer system is illustrative and not intended to limit the present invention. Computer system 600 represents any single or multi-processor computer. Single-threaded and multi-threaded computers can be used. Unified or distributed memory systems can be used.

Computer system 600 includes one or more processors, such as processor 604, and one or more graphics subsystems, such as graphics subsystem 605. One or more processors 604 and one or more graphics subsystems 605 can execute software and implement all or part of the features of the present invention described herein. Graphics subsystem 605 can be implemented, for example, on a single chip as a part of processor 604, or it can be implemented on one or more separate chips located on a graphic board. Each processor 604 is connected to a communication infrastructure 602 (e.g., a communications bus, cross-bar, or network). After reading this description, it will become apparent to a person skilled in the relevant art how to implement the invention using other computer systems and/or computer architectures.

Computer system 600 also includes a main memory 608, preferably random access memory (RAM), and can also include secondary memory 610. Secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618 represents a floppy disk, magnetic tape, optical disk, etc., which is read by and written to by removable storage drive 614. As will be appreciated, the removable storage unit 618 includes a computer usable storage medium having stored therein computer software and/or data.

In alternative embodiments, secondary memory 610 may include other means for allowing computer programs or other instructions to be loaded into computer system 600. Such means can include, for example, a removable storage unit 622 and an interface 620. Examples can include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

In an embodiment, computer system 600 includes a frame buffer 606 and a display 607. Frame buffer 606 is in electrical communication with graphics subsystem 605. Images stored in frame buffer 606 can be viewed using display 607.

Computer system 600 can also include a communications interface 624. Communications interface 624 allows software and data to be transferred between computer system 600 and external devices via communications path 626. Examples of communications interface 624 can include a modem, a network interface (such as Ethernet card), a communications port, etc. Software and data transferred via communications interface 624 are in the form of signals which can be electronic, electromagnetic, optical or other signals capable of being received by communications interface 624, via communications path 626. Note that communications interface 624 provides a means by which computer system 600 can interface to a network such as the Internet.

Computer system 600 can include one or more peripheral devices 632, which are coupled to communications infrastructure 602 by graphical user-interface 630. Example peripheral devices 632, which can form a part of computer system 600, include, for example, a keyboard, a pointing device (e.g., a mouse), a joy stick, and a game pad. Other peripheral devices 632, which can form a part of computer system 600 will be known to a person skilled in the relevant art given the description herein.

The present invention can be implemented using software running (that is, executing) in an environment similar to that described above with respect to FIG. 6. In this document, the term "computer program product" is used to generally refer to removable storage unit 618, a hard disk installed in hard disk drive 612, or a carrier wave or other signal carrying software over a communication path 626 (wireless link or cable) to communication interface 624. A computer useable medium can include magnetic media, optical media, or other recordable media, or media that transmits a carrier wave. These computer program products are means for providing software to computer system 600.

Computer programs (also called software or computer control logic) are stored in main memory 608 and/or secondary memory 610. Computer programs can also be received via communications interface 624. Such computer programs, when executed, enable the computer system 600 to perform the features of the present invention as discussed herein. Accordingly, such computer programs represent controllers of the computer system 600.

In an embodiment where the invention is implemented using software, the software may be stored in a computer program product and loaded into computer system 600 using removable storage drive 614, hard drive 612, or communications interface 624. Alternatively, the computer program product may be downloaded to computer system 600 over communications path 626 (which may be the global Internet). The control logic (software), when executed by the one or more processors 604, causes the processor(s) 604 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

Figure 7:
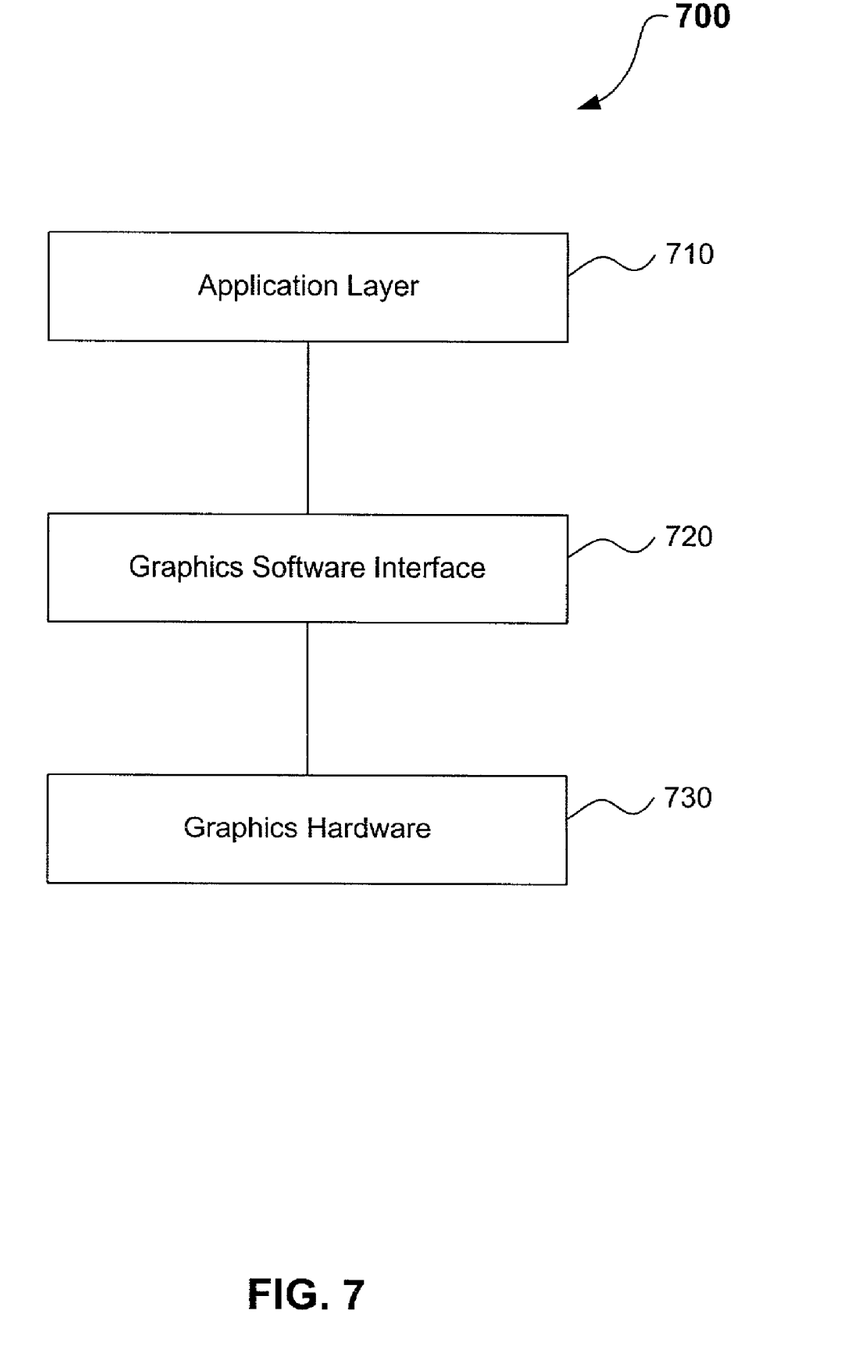
FIG. 7 illustrates a hierarchy of software and hardware used to explain operation of the method of the invention.

FIG. 7 illustrates a hierarchy of software and hardware in an illustrative computer graphics environment for implementing the present invention. An application layer 710 represents a software application written in any programming language known to one skilled in the art for accomplishing a task at hand. A Graphics Software Interface layer 720 interacts with the application layer to perform the graphics tasks requested by application layer 710. A graphics hardware layer 930 represents a computer hardware system such as that depicted in FIG. 6. In one embodiment, graphics hardware layer 930 is an Indigo$^2$, Indy, Onyx, Onyx2, Infinite Reality, Infinite Reality 2, or O$_2$ graphics workstations, manufactured by Silicon Graphics, Inc., of Mountain View, Calif. In another embodiment, however, graphics hardware layer 930 is a computer having an INTEL microprocessor (available from Intel Corp., Santa Clara Calif.) and running a WINDOWS operating system (available from Microsoft Corporation, Redmond, Wash.) or a Macintosh computer (manufactured by Apple Computer, Inc., Cupertino, Calif.).

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method for applying a digital watermark to output images from a computer program, comprising:

generating, for each of the output images, the digital watermark, the digital watermark having at least one attribute, wherein each attribute is a function of a variable associated with the attribute, the variable being capable of modification from image to image to produce a different digital watermark on each of the output images; and applying the digital watermark to each output image to produce corresponding watermarked images, wherein said generating step comprises retrieving, based on at least one variable, at least a portion of the digital watermark from a memory having a plurality of different watermark portions, wherein said at least one attribute is varied amongst said different watermark portions.

2. The method of claim 1, wherein the generating step further comprises:

generating, for each of the output images, the digital watermark, wherein said at least one attribute of the digital watermark is a function of a random number.

3. The method of claim 1, wherein said generating step further comprises:

modifying at least one further attribute of the watermark based on the associated variable.

4. The method of claim 3, wherein said generating step further comprises:

generating, for each of the output images, the digital watermark, wherein said at least one attribute comprises font type, x-dimension size, y-dimension size, rotation, text spacing, line spacing, or opacity.

5. The method of claim 3, wherein said applying step comprises, for each output image:

selecting at least one position on each output image color channel at which to apply the digital watermark, wherein the selected position on each output image color channel can be varied from one application of the digital watermark to another application of the digital watermark to generate chromatic aberration; and blending the digital watermark with said output image at said selected position to produce a watermarked output image.

6. The method of claim 5, wherein said applying step further comprises, for each output image, the following steps before said blending step:

transforming the digital watermark; and modifying opacity of the digital watermark.

7. The method of claim 6, wherein said transforming, comprises:

transforming the digital watermark, wherein said transforming occurs across each color channel of the output image and can be varied from one application of the digital watermark to another application of the digital watermark.

8. The method of claim 6, wherein said modifying step comprises:

varying opacity of the watermark on a per-pixel basis based on brightness of corresponding pixels in the output image.

9. The method of claim 8, wherein said transforming step, comprises:

scaling values in each color channel by a random amount on each pixel to generate chromatic noise.

10. The method of claim 6, wherein said modifying step comprises:

varying opacity of the watermark based on detail in the output image.

11. The method of claim 6, further comprising:

limiting size of the output image to a specified value.

12. The method of claim 6, further comprising: limiting per-pixel color resolution of the output image to a specified value.

13. The method of claim 5, wherein said blending step comprises:

perturbing each color channel of the digital watermark.

14. The method of claim 5, further comprising:

altering the applied digital watermark to create an embossed appearance.

15. The method of claim 14, wherein said altering step comprises:

performing a saturated add operation of the digital watermark for each output image such that the digital watermark is added to each of four channels of each output image; and half-subtracting the digital watermark at a location represented by a specified value and such that only red, blue, and green channels of each output image are affected.

16. The method of claim 1, wherein said applying step comprises:

randomly applying the digital watermark to each output image.

17. The method of claim 1, wherein said applying step comprises:

applying the digital watermark to each output image, wherein the output image is a texture in a graphical scene.

18. The method of claim 1, further comprising:

repeating said generating and applying steps a plurality of times for each output image.

19. The method of claim 1, where said generating step further comprises:

retrieving, based on the variable, a plurality of different portions of the digital watermark from said memory, wherein the at least one attribute is varied amongst said plurality of different watermark portions.

20. The method of claim 1, further comprising:

applying said watermark to a substantial portion of said output images to produce corresponding watermarked images.

21. The method of claim 1, further comprising:

ensuring that there is overlap, from image to image, in the watermarked portions of said watermarked images.

22. A computer program product comprising a computer usable medium having computer program logic for enabling a processor to apply a digital watermark to output images from a computer program, comprising:

first means for enabling the processor to generate, for each of the output images, the digital watermark, the digital watermark having at least one attribute, wherein each attribute is a function of a variable associated with the attribute, the variable being capable of modification from image to image to produce a different digital watermark on each of the output images; and second means for enabling the processor to apply the digital watermark to each output image to produce corresponding watermarked images, wherein said first means comprises means for enabling the processor to generate, for each output image, the digital watermark, by retrieving at least a portion of the digital watermark from a memory having a plurality of different watermark portions, wherein said at least one attribute is varied amongst said different watermark portions.

23. The computer program product of claim 22, wherein said first means comprises:

means for enabling the processor to generate, for each of the output images, the digital watermark, wherein each attribute of the digital watermark is a function of a random number.

24. The computer program product of claim 22, wherein said first means further comprises:

means for enabling the processor to modify at least one further attribute of the watermark based on the associated variable.

25. The computer program product of claim 24, wherein said first means further comprises:

means for enabling the processor to generate, for each of the output images, the digital watermark, wherein said at least one attribute comprises font type, x-dimension size, y-dimension size, rotation, text spacing, line spacing, and/or opacity.

26. The computer program product of claim 24, wherein said second means comprises:

means for enabling the processor to apply the digital watermark to each output image by selecting at least one position on each output image color channel at which to apply the digital watermark, wherein the selected position on each output image color channel can be varied from one application of the digital watermark to another application of the digital watermark to generate chromatic aberration; and blending the digital watermark with the output image at the selected position to produce a watermarked output image.

27. The computer program product of claim 26, wherein said second means further comprises:

means for enabling the processor to apply the digital watermark to each output image by transforming the digital watermark; and
modifying opacity of the digital watermark.

28. The computer program product of claim 27, wherein said means for enabling the processor to apply the digital watermark to each output image comprises:
    means for enabling the processor to transform the digital watermark, wherein said transforming occurs across each color channel of the output image and can be varied from one application of the digital watermark to another application of the digital watermark.

29. The computer program product of claim 27, wherein said means for enabling the processor to apply the digital watermark to each output image, further comprises:
    means for enabling the processor to vary opacity of the watermark on a per-pixel basis based on brightness of corresponding pixels in the output image.

30. The computer program product of claim 27, wherein said means for enabling the processor to apply the digital watermark to each output image, further comprises:
    means for enabling the processor to vary opacity of the watermark based on detail in the output image.

31. The computer program product of claim 27 wherein said means for enabling the processor to apply the digital watermark to each output image, further comprises:
    means for enabling the processor to limit size of the output image to a specified value.

32. The computer program product of claim 27, wherein said means for enabling the processor to apply the digital watermark to each output image, further comprises:
    means for enabling the processor to limit per-pixel color resolution of the output image to a specified value.

33. The computer program product of claim 27, wherein said second means comprises:
    means for enabling the processor to apply the digital watermark to each output image by:
    scaling values in each color channel by a random amount on each pixel to generate chromatic noise; and
    modifying opacity of the digital watermark.

34. The computer program product of claim 26, wherein said second means comprises:
    means for enabling the processor to blend the digital watermark with each output image at the selected position to produce a watermarked output image by perturbing each color channel of the digital watermark; and
    performing a saturated add operation of the digital watermark to each output image.

35. The computer program product of claim 26, further comprising:
    third means for enabling the processor to alter the applied digital watermark to create an embossed appearance.

36. The computer program product of claim 35, wherein said third means comprises:
    means for enabling the processor to alter the applied digital watermark to create an embossed appearance by performing a saturated add operation of the digital watermark for each output image such that the digital watermark is added to each of the four channels of each output; and
    half-subtracting the digital watermark at a location represented by a specified value and such that only red, blue, and green channels of said output image are affected.

37. The computer program product of claim 22, wherein said second means further comprises:
    means for enabling the processor to repeat the generation and application of the digital watermark a plurality of times for each output image.

38. The computer program product of claim 22, wherein said first means further comprises:
    means for enabling the processor to generate, for each output image, the digital watermark, by retrieving, based on said first variable, a plurality of different portions of the digital watermark from said memory, wherein said at least one attribute is varied amongst said plurality of different portions.

39. The computer program product of claim 22, wherein said second means comprises:
    means for enabling the processor to randomly apply the digital watermark to each output image.

40. The computer program product of claim 22, wherein said second means comprises:
    means for enabling the processor to apply the digital watermark to each output image, wherein the output image is a texture in a graphical scene.

41. The computer program product of claim 22, wherein said second means comprises:
    means for enabling the processor to apply the digital watermark to each output image, wherein the output image is a rendered image.

42. The computer program product of claim 22, wherein said second means comprises:
    means for enabling the processor to signal graphics hardware to apply the digital watermark to each output image to produce a watermarked image on a computer display screen.

* * * * *